US009133723B2

(12) United States Patent
Vo et al.

(10) Patent No.: US 9,133,723 B2
(45) Date of Patent: Sep. 15, 2015

(54) SHIELD SYSTEM FOR GAS TURBINE ENGINE

(75) Inventors: Tuan David Vo, Middletown, CT (US); Christina A. Stenman, Wethersfield, CT (US); Shelton O. Duelm, Wethersfield, CT (US)

(73) Assignee: United Technologies Corporation, Hartford, CT (US)

( * ) Notice: Subject to any disclaimer, the term of this patent is extended or adjusted under 35 U.S.C. 154(b) by 531 days.

(21) Appl. No.: 13/476,062

(22) Filed: May 21, 2012

(65) Prior Publication Data

US 2013/0309078 A1 Nov. 21, 2013

(51) Int. Cl.
| | |
|---|---|
| F01D 25/26 | (2006.01) |
| F01D 9/04 | (2006.01) |
| F02C 7/24 | (2006.01) |
| F02C 7/28 | (2006.01) |
| F01D 11/00 | (2006.01) |
| F01D 11/08 | (2006.01) |
| F01D 25/14 | (2006.01) |
| F01D 25/24 | (2006.01) |
| F01D 25/28 | (2006.01) |

(52) U.S. Cl.
CPC ............. F01D 9/04 (2013.01); F01D 11/005 (2013.01); F01D 11/08 (2013.01); F01D 25/14 (2013.01); F01D 25/24 (2013.01); F01D 25/246 (2013.01); F01D 25/26 (2013.01); F01D 25/28 (2013.01); F02C 7/24 (2013.01); F02C 7/28 (2013.01); F05D 2240/14 (2013.01); F05D 2240/15 (2013.01); F05D 2260/231 (2013.01); Y02T 50/675 (2013.01)

(58) Field of Classification Search
CPC ......... F01D 9/02; F01D 11/005; F01D 25/12; F01D 25/26; F01D 25/28; F05D 2240/14; F05D 2240/15; F05D 2260/231; F02C 7/24; F02C 7/28
USPC ........... 415/121.2, 171.1, 173.7, 208.1, 211.1
See application file for complete search history.

(56) References Cited

U.S. PATENT DOCUMENTS

| | | | |
|---|---|---|---|
| 3,945,758 A | 3/1976 | Lee | |
| 4,163,629 A | 8/1979 | McDonough et al. | |
| 4,460,313 A | 7/1984 | Austrem | |
| 4,478,551 A * | 10/1984 | Honeycutt et al. | ............ 415/142 |
| 4,772,178 A | 9/1988 | Miller | |
| 5,149,250 A * | 9/1992 | Plemmons et al. | ........ 415/209.3 |
| 5,211,536 A * | 5/1993 | Ackerman et al. | ............ 415/177 |
| 5,218,816 A | 6/1993 | Plemmons et al. | |
| 5,224,822 A * | 7/1993 | Lenahan et al. | ............. 415/189 |
| 5,597,286 A * | 1/1997 | Dawson et al. | ............... 415/115 |
| 6,860,719 B2 | 3/2005 | Burdgick | |
| 7,264,442 B2 * | 9/2007 | Harding | ..................... 415/173.7 |
| 7,854,586 B2 | 12/2010 | Major et al. | |
| 2003/0226362 A1* | 12/2003 | Niday et al. | .................... 60/796 |
| 2008/0112793 A1* | 5/2008 | Lee et al. | ..................... 415/115 |

(Continued)

OTHER PUBLICATIONS

International Search Report and Written Opinion for International Application No. PCT/US2013/040867 completed on Sep. 10, 2013.

(Continued)

*Primary Examiner* — Ninh H Nguyen
(74) *Attorney, Agent, or Firm* — Carlson, Gaskey & Olds, PC

(57) ABSTRACT

A shield system for a gas turbine engine extends between an inner case structure and a vane pack.

31 Claims, 3 Drawing Sheets

(56) References Cited

U.S. PATENT DOCUMENTS

2010/0254807 A1* 10/2010 Smoke et al. .............. 415/174.2
2011/0079019 A1    4/2011 Durocher et al.
2011/0081237 A1    4/2011 Durocher et al.

OTHER PUBLICATIONS

International Preliminary Report on Patentability for International Application No. PCT/US2013/040867 mailed Dec. 4, 2014.

* cited by examiner

SHIELD SYSTEM FOR GAS TURBINE ENGINE

BACKGROUND

A typical jet engine has multiple shafts or spools that transmit torque between turbine and compressor sections of the engine. In one example, a low speed spool generally includes a low shaft that interconnects a fan, a low pressure compressor, and a low pressure turbine. A high speed spool generally includes a high shaft that interconnects a high pressure compressor and a high pressure turbine. A mid-turbine frame is arranged generally between the high pressure turbine and the low pressure turbine. The mid-turbine frame supports one or more bearing systems in the turbine section of the engine. Hot air exiting the mid-turbine frame section and entering the low pressure turbine can adversely affect engine operating efficiencies.

SUMMARY

In a featured embodiment, a shield system for a gas turbine engine comprising has an inner portion configured for attachment to an inner case structure. An outer portion is spaced radially outward of the inner portion and configured for attachment to a vane pack.

In another embodiment according to the previous embodiment, the vane pack is positioned within a turbine section of the gas turbine engine.

In another embodiment according to any of the previous embodiments, the inner case structure comprises a mid-turbine frame structure.

In another embodiment according to any of the previous embodiments, the inner portion comprises a seal and the outer portion comprises a flow discourager that is attached to the seal.

In another embodiment according to any of the previous embodiments, the seal and flow discourager are welded together.

In another embodiment according to any of the previous embodiments, the seal has a curvilinear cross-section and the flow discourager has a Z-shaped cross-section.

In another embodiment according to any of the previous embodiments, the inner portion is fixed to the inner case portion and the outer portion is thermally free for movement relative to the vane pack.

In another embodiment according to any of the previous embodiments, a first set of fasteners attach the outer portion to the vane pack and a second set of fasteners attach the inner portion to the inner case structure.

In another embodiment according to any of the previous embodiments, a bushing is clamped to a vane mount portion of the vane pack with each first set of fasteners.

In another embodiment according to any of the previous embodiments, the bushing includes a flange spaced from an aft end face of the vane mount portion such that the outer portion is positioned between the vane and the flange, and wherein the outer portion is axially constrained by the bushing but is free to move circumferentially and radially relative to the vane.

In another embodiment according to any of the previous embodiments, a leg seal is positioned between the aft end face of the vane mount portion and the outer portion of the body.

In another featured embodiment, a gas turbine engine has a mid-turbine frame including an inner case structure. A low pressure turbine is positioned aft of the mid-turbine frame, and includes a vane pack and a plurality of blades that rotate about an engine central axis. A shield assembly has a radially inner portion attached to the inner case structure and a radially outer portion attached to the vane pack.

In another embodiment according to the previous embodiment, the shield assembly includes a seal and a flow discourager, the seal having an inner peripheral portion fixed to the inner case structure and an outer peripheral portion attached to the flow discourager.

In another embodiment according to any of the previous embodiments, the flow discourager extends to a distal end that is configured to be moveable in an axial direction relative to the vane pack In another embodiment according to any of the previous embodiments, the flow discourager has a Z-shaped cross-section.

In another embodiment according to any of the previous embodiments, the vane pack includes a vane mount portion. The seal and flow discourager are attached to the vane mount portion with a fastener and bushing assembly such that the seal is constrained from axial movement relative to the vane pack but is free to move in a circumferential and a radial direction relative to the vane pack.

In another embodiment according to any of the previous embodiments, a leg seal has one end abutting against the vane mount portion and an opposite end abutting against the seal.

In another embodiment according to any of the previous embodiments, the seal has a curvilinear cross-section comprising a first portion at the inner case structure that extends in a direction radially outwardly from the axis, a second portion that extends from the first portion in an axial direction aft of the first portion, a third portion that extends radially outwardly from the second portion, a fourth portion that extends from the third portion in an axial direction aft of the third portion, and a fifth portion that extends radially outwardly from the fourth portion toward the vane pack.

In another embodiment according to any of the previous embodiments, a curved transition portion is between each of the first and second portions, the second and third portions, the third and fourth portions, and the fourth and fifth portions.

In another embodiment according to any of the previous embodiments, the outer peripheral portion has first and second sets of through holes to receive fasteners for attachment to the vane pack, the first set of through holes having a first shape and the second set of through holes having a second shape that is different than the first shape.

BRIEF DESCRIPTION OF THE DRAWINGS

The disclosure can be further understood by reference to the following detailed description when considered in connection with the accompanying drawings wherein.

DETAILED DESCRIPTION

Figure 1:
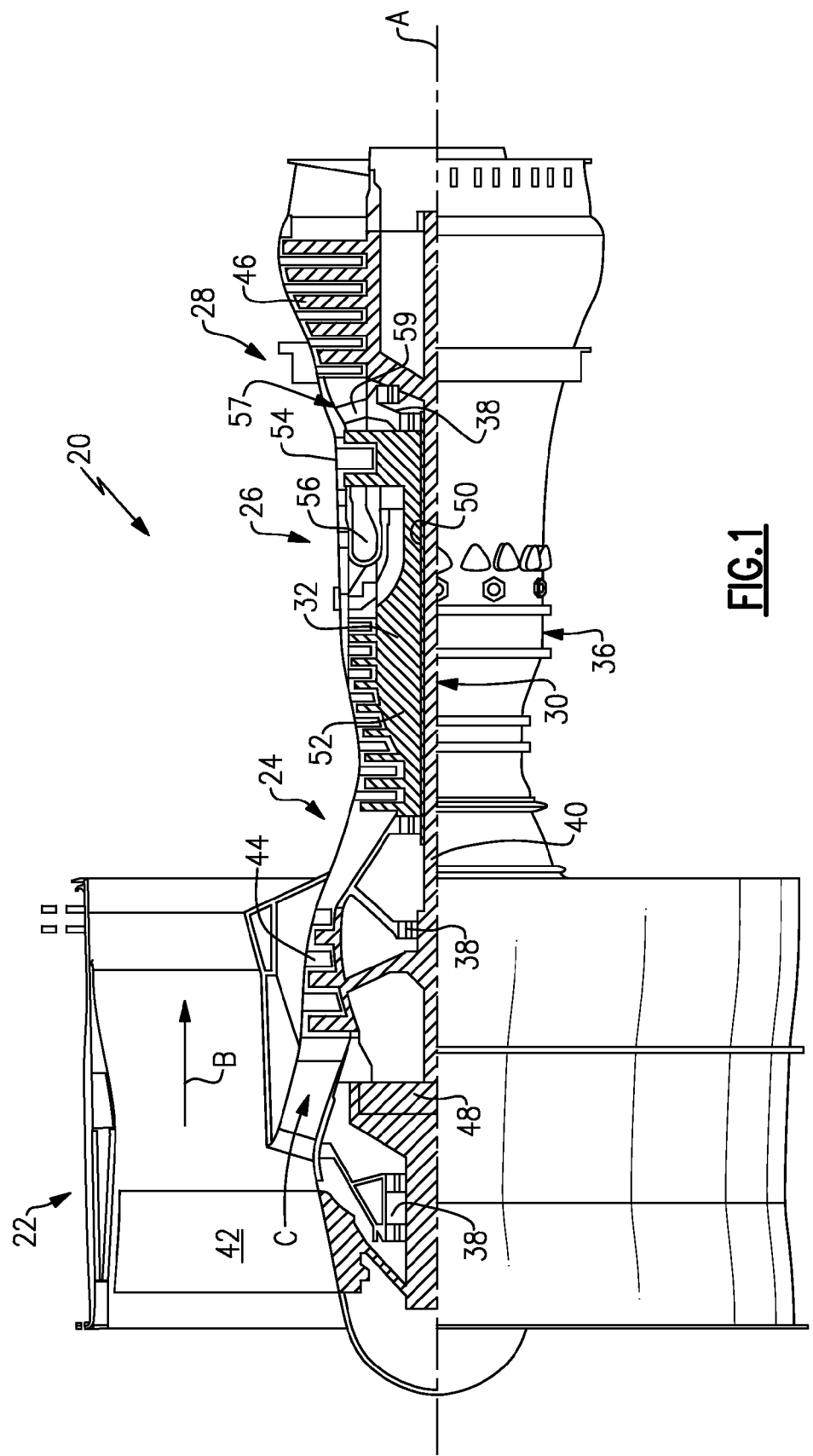
FIG. 1 schematically illustrates a gas turbine engine embodiment.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flowpath B while the compressor section 24 drives air along a core flowpath C for compression and communication into the combustor section 26 then expansion through the turbine section 28. Although depicted as a turbofan gas turbine engine in the disclosed non-limiting embodiment, it should be understood that the concepts described herein are not limited to use with turbofans as the teachings may be applied to other types of turbine engines including three-spool architectures.

The engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided.

The low speed spool 30 generally includes an inner shaft 40 that interconnects a fan 42, a low pressure (or first) compressor section 44 and a low pressure (or first) turbine section 46. The inner shaft 40 is connected to the fan 42 through a geared architecture 48 to drive the fan 42 at a lower speed than the low speed spool 30. The high speed spool 32 includes an outer shaft 50 that interconnects a high pressure (or second) compressor section 52 and high pressure (or second) turbine section 54. A combustor 56 is arranged between the high pressure compressor 52 and the high pressure turbine 54. A mid-turbine frame 57 of the engine static structure 36 is arranged generally between the high pressure turbine 54 and the low pressure turbine 46. The mid-turbine frame 57 supports one or more bearing systems 38 in the turbine section 28. The inner shaft 40 and the outer shaft 50 are concentric and rotate via bearing systems 38 about the engine central longitudinal axis A, which is collinear with their longitudinal axes. As used herein, a "high pressure" compressor or turbine experiences a higher pressure than a corresponding "low pressure" compressor or turbine.

The core airflow C is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path. The turbines 46, 54 rotationally drive the respective low speed spool 30 and high speed spool 32 in response to the expansion.

The engine 20 in one example is a high-bypass geared aircraft engine. In a further example, the engine 20 bypass ratio is greater than about six (6), with an example embodiment being greater than ten (10), the geared architecture 48 is an epicyclic gear train, such as a star gear system or other gear system, with a gear reduction ratio of greater than about 2.3 and the low pressure turbine 46 has a pressure ratio that is greater than about 5. In one disclosed embodiment, the engine 20 bypass ratio is greater than about ten (10:1), the fan diameter is significantly larger than that of the low pressure compressor 44, and the low pressure turbine 46 has a pressure ratio that is greater than about 5:1. Low pressure turbine 46 pressure ratio is pressure measured prior to inlet of low pressure turbine 46 as related to the pressure at the outlet of the low pressure turbine 46 prior to an exhaust nozzle. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft, with the engine at its best fuel consumption—also known as "bucket cruise Thrust Specific Fuel Consumption ('TSFCT')"—is the industry standard parameter of lbm of fuel being burned per hour divided by lbf of thrust the engine produces at that minimum point. "Fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tambient deg R)/518.7)^0.5]. The "Low corrected fan tip speed" as disclosed herein according to one non-limiting embodiment is less than about 1150 ft/second (350 meters/second).

Figure 2:
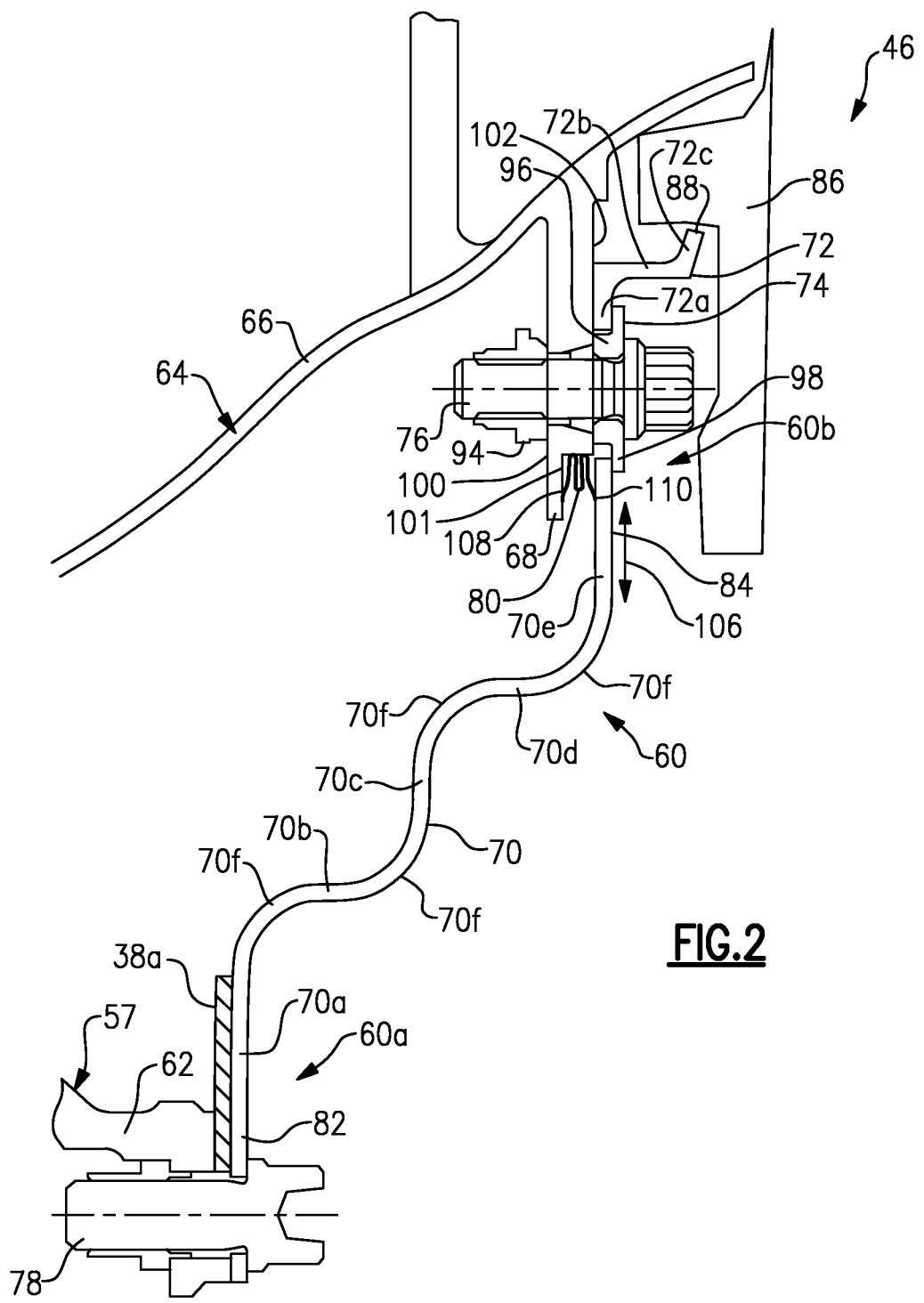
FIG. 2 is a cross-sectional view of a shield system.
Figure 3:
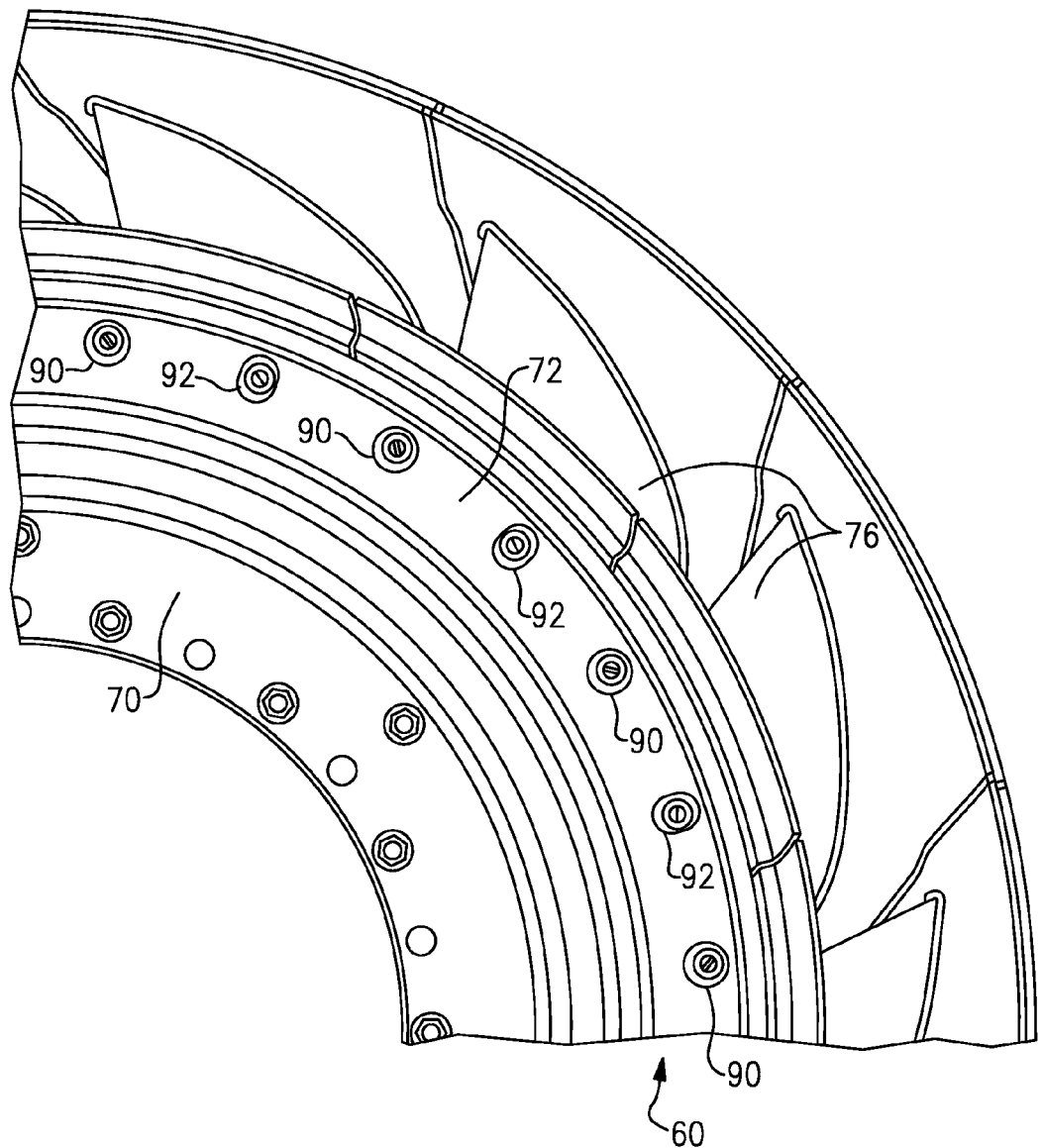
FIG. 3 is a partial end view of the shield system.

FIGS. 2 and 3 show an example of a shield system 60 that is utilized in the engine 20 of FIG. 1. In one example, the shield system 60 is positioned in an aft end of the mid-turbine frame 57 and is configured to seal hot air from entering the low pressure turbine 46. The shield system 60 extends between a bearing housing/inner case structure 62 of the mid-turbine frame 57 and a vane pack 64 of the low pressure turbine 46. The shield system 60 is comprised of multiple components and has an inner portion 60a that is fixed to the inner case structure 62 and an outer portion 60b that is attached to the vane pack 64. The inner portion 60a is constrained from movement relative to the inner case structure 62. The outer portion 60b is configured to accommodate both circumferential and radial movement relative to the vane pack 64.

The vane pack 64 includes a vane mount portion 68 that extends radially inwardly from a case structure 66 in a direction toward the axis A. The inner case structure 62 comprises an aft flange that provides a connection interface for the shield system 60 as well as for a housing structure 38a for the bearing system 38 (FIG. 1) positioned at the mid-turbine frame 57. This is just one example mounting configuration for the inner end of the seal, it should be understood that other mounting configurations could also be used.

The shield system 60 comprises a seal 70, a flow discourager 72, a bushing 74, a first set of fasteners 76, a second set of fasteners 78, and a leg seal 80. The seal 70 includes an inner peripheral portion 82 that is fixed to the inner case structure 62 and an outer peripheral portion 84 that is attached to an inner peripheral portion of the flow discourager 72. In one example, the seal 70 and flow discourager 72 are comprised of high temperature metal alloy materials that are welded together to form a unitary ring-shaped structure.

The seal 70 has a curvilinear cross-section comprising a first portion 70a at the inner case structure 62 that extends in a direction radially outwardly from the axis A. A second portion 70b extends from the first portion 70a in an axial direction aft of the first portion 70a. A third portion 70c extends radially outwardly from the second portion 70b. A fourth portion 70d extends from the third portion 70c in an axial direction aft of the third portion 70c. A fifth portion 70e extends radially outwardly from the fourth portion 70d in a direction toward the vane pack 64. A curved portion 70f transitions between each of the first 70a and second 70b portions, the second 70b and third 70c portions, the third 70c and fourth 70d portions, and the fourth 70d and fifth 70e portions. In this example configuration, the seal comprises a two step seal; however, fewer or additional steps could also be utilized in the seal.

The shape of the seal 70 is configured to provide a majority of the reaction loads back to the inner case structure 62 as opposed to the vane pack 64. As such, loading impact to the vane pack 64 is minimized as much as possible.

The flow discourager 72 operates to discourage hot air from the flow path through the mid-turbine frame 57 from entering the low pressure turbine cavity. The flow discourager 72 is shaped to avoid clashing with rotating turbine blades 86 in all flight conditions. The flow discourager 72 has a Z-shaped cross-section comprising a first portion 72a extending in a radial direction away from the axis A, a second portion 72b extending in an aft axial direction from the first portion 72a, and a third portion 72c that extends from the second portion 72b in a generally radial direction. The third portion 72c extends to a distal tip 88 that is free to move relative to the vane pack 64 but is sufficiently spaced from the blades 86 to prevent contact therebetween.

As shown in FIG. 3, the flow discourager 72 also includes a first set of through holes 90 and a second set of through holes 92 that facilitate attachment to the vane pack 64. Both sets of holes 90, 92 are oversized to allow for thermal growth. In one example, the first set of holes 90 have a circular shape to allow for both radial and circumferential growth and the second set of holes 92 have an oval shape to allow for thermal growth only in the radial direction. These shapes are merely examples, it should be understood that other shapes could also be used.

The first set of fasteners 76 are inserted through the holes 90, 92 to secure the seal system 72 to the vane pack 64. One bushing 74 is associated with each hole 90, 92 with the fastener 76 extending through the bushing 74 and the vane mount portion 68. In one example, the fasteners 76 comprise bolts with an associated clinch nut 94 that clamps the bushing 74 to the vane mount portion 68. In one example, fasteners 76 are circumferentially spaced about the axis A to secure the shield system 60 to the vane pack 64 with two bushings/two fasteners being used per each vane.

The bushings 74 are comprised of a short tubular portion 96 and an enlarged flange portion 98. The vane mount portion 68 includes a fore face 100 and an aft face 102. The end of the tubular portion 96 abuts against the aft face 102 such that the flange portion 98 is spaced from the vane mount portion 68 by a gap. This allows portions of the seal 70 and flow discourager 72 to be trapped between the vane mount portion 68 and the bushing 74. The nut 94 and fastener 76 are tightened to constrain the seal 70 and flow discourager 72 from axial movement relative to the vane pack 64. However, as discussed above, the holes 90, 92 are sized to allow for thermal growth in a radial direction as indicated by arrow 106, i.e. the seal 70 is able to move radially relative to the vane pack 64.

The leg seal 80 is used to seal the gap between the seal 70 and the vane pack 64. The leg seal 80 includes a first end 108 that abuts against an aft face 101 of the vane mount portion 68 and an opposite end 110 that abuts against a fore face of the seal 70.

The second set of fasteners 78 is used to secure the inner peripheral portion of the seal 70 to the inner case structure 62. The fasteners 78 are circumferentially spaced about the inner peripheral portion in a manner similar to the first set of fasteners 76. The fasteners 78 axially and radially constrain the inner peripheral portion of the seal 70 to prevent movement relative to the inner case structure 62.

The shield system 60 efficiently seals hot air exiting the mid-turbine frame section from entering the low pressure turbine cavity. Further, the shield system 60 reduces axial loading on the vane pack 64 and further provides vibration damping. The shield system 60 is also configured to accommodate thermal expansion as needed during engine operation. The seal 70 allows radial relative motion between the seal and the vane pack as well as accounting for warping on an individual vane segment.

Although an example embodiment has been disclosed, a worker of ordinary skill in this art would recognize that certain modifications would come within the scope of the claims. For that reason, the following claims should be studied to determine their true scope and content.

What is claimed is:

1. A shield system for a gas turbine engine comprising:
   an inner portion configured for attachment to an inner case structure; and
   an outer portion spaced radially outward of the inner portion relative to an engine center axis and configured for attachment to a vane pack such that the outer portion is prevented from axial movement relative to the vane pack while being capable of radial moveable relative to the vane pack.

2. The shield system according to claim 1, wherein the vane pack is positioned within a turbine section of the gas turbine engine.

3. The shield system according to claim 2, wherein the inner case structure comprises a mid-turbine frame structure.

4. The shield system according to claim 1, wherein the inner portion comprises a seal and the outer portion comprises a flow discourager that is attached to the seal.

5. The shield system according to claim 4, wherein the seal and flow discourager are welded together.

6. The shield system according to claim 4, wherein the seal has a curvilinear cross-section and the flow discourager has a Z-shaped cross-section.

7. The shield system according to claim 1, wherein the inner portion is fixed to the inner case portion and the outer portion is thermally free for movement relative to the vane pack.

8. The shield system according to claim 1, including a first set of fasteners that attach the outer portion to the vane pack and a second set of fasteners that attach the inner portion to the inner case structure.

9. The shield system according to claim 8, including a bushing that is clamped to a vane mount portion of the vane pack with each first set of fasteners.

10. The shield system according to claim 1, wherein the inner portion is attached to the inner case structure such that the inner portion is prevented from axial and radial movement relative to the inner case structure.

11. The shield system according to claim 10, wherein the outer portion is attached to the vane pack such that the radially outer portion is capable of circumferential thermal growth relative to the vane pack.

12. The shield system according to claim 10, wherein the outer portion is attached to the vane pack at an attachment interface that includes at least a first set of fasteners received in at least one set of holes that allow the outer portion to move radially relative to the vane pack.

13. The shield system according to claim 12, wherein the at least one set of holes comprises at least a first set of holes that only allows thermal growth in a radial direction and a second set of holes that allows thermal growth in the radial direction and a circumferential direction.

14. The shield system according to claim 13, wherein the vane pack includes a plurality of vanes and wherein each vane includes one hole from the first set of holes and one hole from the second set of holes.

15. A shield system for a gas turbine engine comprising:
   an inner portion configured for attachment to an inner case structure;
   an outer portion spaced radially outward of the inner portion and configured for attachment to a vane pack;
   a first set of fasteners that attach the outer portion to the vane pack and a second set of fasteners that attach the inner portion to the inner case structure; and a bushing that is clamped to a vane mount portion of the vane pack with each first set of fasteners, wherein the bushing includes a flange spaced from an aft end face of the vane mount portion such that the outer portion is positioned between the vane and the flange, and wherein the outer portion is axially constrained by the bushing but is free to move circumferentially and radially relative to the vane.

16. The shield system according to claim 5, including a leg seal positioned between the aft end face of the vane mount portion and the outer portion of the body.

17. A gas turbine engine comprising:
a mid-turbine frame including an inner case structure;
a low pressure turbine positioned aft of the mid-turbine frame, the low pressure turbine including a vane pack and a plurality of blades that rotate about an engine central axis; and
a shield assembly having a radially inner portion attached to the inner case structure and a radially outer portion attached to the vane pack.

18. The gas turbine engine according to claim 17, wherein the shield assembly includes a seal and a flow discourager, the seal having an inner peripheral portion fixed to the inner case structure and an outer peripheral portion attached to the flow discourager.

19. The gas turbine engine according to claim 18, wherein the flow discourager extends to a distal end that is configured to be moveable in an axial direction relative to the vane pack.

20. The gas turbine engine according to claim 19, wherein the flow discourager has a Z-shaped cross-section.

21. The gas turbine engine according to claim 19, wherein the vane pack includes a vane mount portion and wherein the seal and flow discourager are attached to the vane mount portion with a fastener and bushing assembly such that the seal is constrained from axial movement relative to the vane pack but is free to move in a circumferential and a radial direction relative to the vane pack.

22. The gas turbine engine according to claim 21, including a leg seal having one end abutting against the vane mount portion and an opposite end abutting against the seal.

23. The gas turbine engine according to claim 18, wherein the seal has a curvilinear cross-section comprising a first portion at the inner case structure that extends in a direction radially outwardly from the axis, a second portion that extends from the first portion in an axial direction aft of the first portion, a third portion that extends radially outwardly from the second portion, a fourth portion that extends from the third portion in an axial direction aft of the third portion, and a fifth portion that extends radially outwardly from the fourth portion toward the vane pack.

24. The gas turbine engine according to claim 23, including a curved transition portion between each of the first and second portions, the second and third portions, the third and fourth portions, and the fourth and fifth portions.

25. The gas turbine engine according to claim 18, wherein the outer peripheral portion has first and second sets of through holes to receive fasteners for attachment to the vane pack, the first set of through holes having a first shape and the second set of through holes having a second shape that is different than the first shape.

26. The gas turbine engine according to claim 17, wherein the radially outer portion is attached to the vane pack such that the radially outer portion is prevented from axial movement relative to the vane pack while being capable of radial movement relative to the vane pack.

27. The gas turbine engine according to claim 26, wherein the radially inner portion is attached to the inner case structure such that the radially inner portion is prevented from axial and radial movement relative to the inner case structure.

28. The gas turbine engine according to claim 26, wherein the radially outer portion is attached to the vane pack such that the radially outer portion is capable of circumferential thermal growth relative to the vane pack.

29. The gas turbine engine according to claim 26, wherein the radially outer portion is attached to the vane pack at an attachment interface that includes at least a first set of fasteners received in at least one set of holes that allow the radially outer portion to move radially relative to the vane pack.

30. The gas turbine engine according to claim 29, wherein the at least one set of holes comprises at least a first set of holes that only allows thermal growth in a radial direction and a second set of holes that allows thermal growth in the radial direction and a circumferential direction.

31. The gas turbine engine according to claim 30, wherein the vane pack includes a plurality of vanes and wherein each vane includes one hole from the first set of holes and one hole from the second set of holes.

* * * * *